(12) United States Patent
Chen

(10) Patent No.: US 7,285,744 B2
(45) Date of Patent: Oct. 23, 2007

(54) METHOD AND APPARATUS FOR SIMULTANEOUSLY HEATING MATERIALS

(75) Inventor: Jie-Wei Chen, Alpnach-Dorf (CH)

(73) Assignee: Leister Process Technologies (CH)

( * ) Notice: Subject to any disclaimer, the term of this patent is extended or adjusted under 35 U.S.C. 154(b) by 22 days.

(21) Appl. No.: 10/919,848

(22) Filed: Aug. 17, 2004

(65) Prior Publication Data
US 2005/0077276 A1  Apr. 14, 2005

(30) Foreign Application Priority Data
Aug. 21, 2003  (EP)  ................................. 03018970

(51) Int. Cl.
*B23K 26/06* (2006.01)
*B23K 26/073* (2006.01)
*B23K 26/20* (2006.01)

(52) U.S. Cl. ............... 219/121.63; 219/121.64; 219/121.73; 219/121.75; 385/146

(58) Field of Classification Search ........... 219/121.63, 219/121.64, 121.77, 121.73, 121.75; 385/146
See application file for complete search history.

(56) References Cited

U.S. PATENT DOCUMENTS

| | | | | |
|---|---|---|---|---|
| 3,419,321 A | * | 12/1968 | Barber et al. ............. | 219/121.7 |
| 4,097,118 A | * | 6/1978 | Hammer ........................ | 385/30 |
| 4,799,755 A | * | 1/1989 | Jones .......................... | 385/38 |
| 4,824,194 A | * | 4/1989 | Karasawa ................... | 385/146 |
| 4,941,093 A | * | 7/1990 | Marshall et al. ............... | 606/5 |
| 4,941,734 A | * | 7/1990 | Williams et al. ............. | 359/896 |
| 5,200,230 A | * | 4/1993 | Poullos et al. .................. | 427/8 |
| 5,251,060 A | * | 10/1993 | Uenishi et al. ............. | 359/328 |
| 5,261,904 A | * | 11/1993 | Baker et al. .................. | 606/17 |
| 5,607,730 A | * | 3/1997 | Ranalli ........................ | 427/512 |
| 5,677,920 A | * | 10/1997 | Waarts et al. .................. | 372/6 |
| 5,778,133 A | * | 7/1998 | Plesko ........................ | 385/146 |
| 6,004,487 A | * | 12/1999 | Wada et al. ............... | 264/1.33 |
| 6,760,973 B1 | * | 7/2004 | Koide ........................ | 29/890.1 |
| 6,858,104 B2 | * | 2/2005 | Flanagan ..................... | 156/64 |
| 6,860,960 B1 | * | 3/2005 | Flanagan ................. | 156/272.8 |
| 2003/0128957 A1 | * | 7/2003 | Kalantar ..................... | 385/146 |
| 2004/0105482 A1 | * | 6/2004 | Sugiyama et al. .......... | 372/108 |

FOREIGN PATENT DOCUMENTS

| | | | | |
|---|---|---|---|---|
| DE | 003904662 A1 | * | 8/1990 |
| EP | 0282593 B1 | * | 9/1993 |
| JP | 362151289 A | * | 7/1987 |
| JP | 402299791 A | * | 12/1990 |
| JP | 403170616 A | * | 7/1991 |
| JP | 403185776 A | * | 8/1991 |
| JP | 404012745 A | * | 1/1992 |
| JP | 404034505 A | * | 2/1992 |

(Continued)

*Primary Examiner*—Samuel M. Heinrich
(74) *Attorney, Agent, or Firm*—Bachman & LaPointe

(57) ABSTRACT

A method and apparatus for simultaneously heating materials, in particular for welding plastic components, having an arbitrary shape of a flat heating contour by laser radiation is provided. The apparatus has, an appropriate optical arrangement that is used to convert a laser beam into an annular laser beam and focus it onto the end wall of a light-guiding tube and couple it in. At an exit end, the tube is deformed in accordance with the desired heating contour such that the emerging laser beam has this heating contour.

7 Claims, 2 Drawing Sheets

FOREIGN PATENT DOCUMENTS

| | | | | |
|---|---|---|---|---|
| JP | 405069172 A | * | 3/1993 |
| JP | 405208258 A | * | 8/1993 |
| JP | 406262384 A | * | 9/1994 |
| JP | 2002283086 | * | 10/2002 |
| JP | 02003121705 A | * | 4/2003 |
| WO | WO9104829 A1 | * | 4/1991 |

* cited by examiner

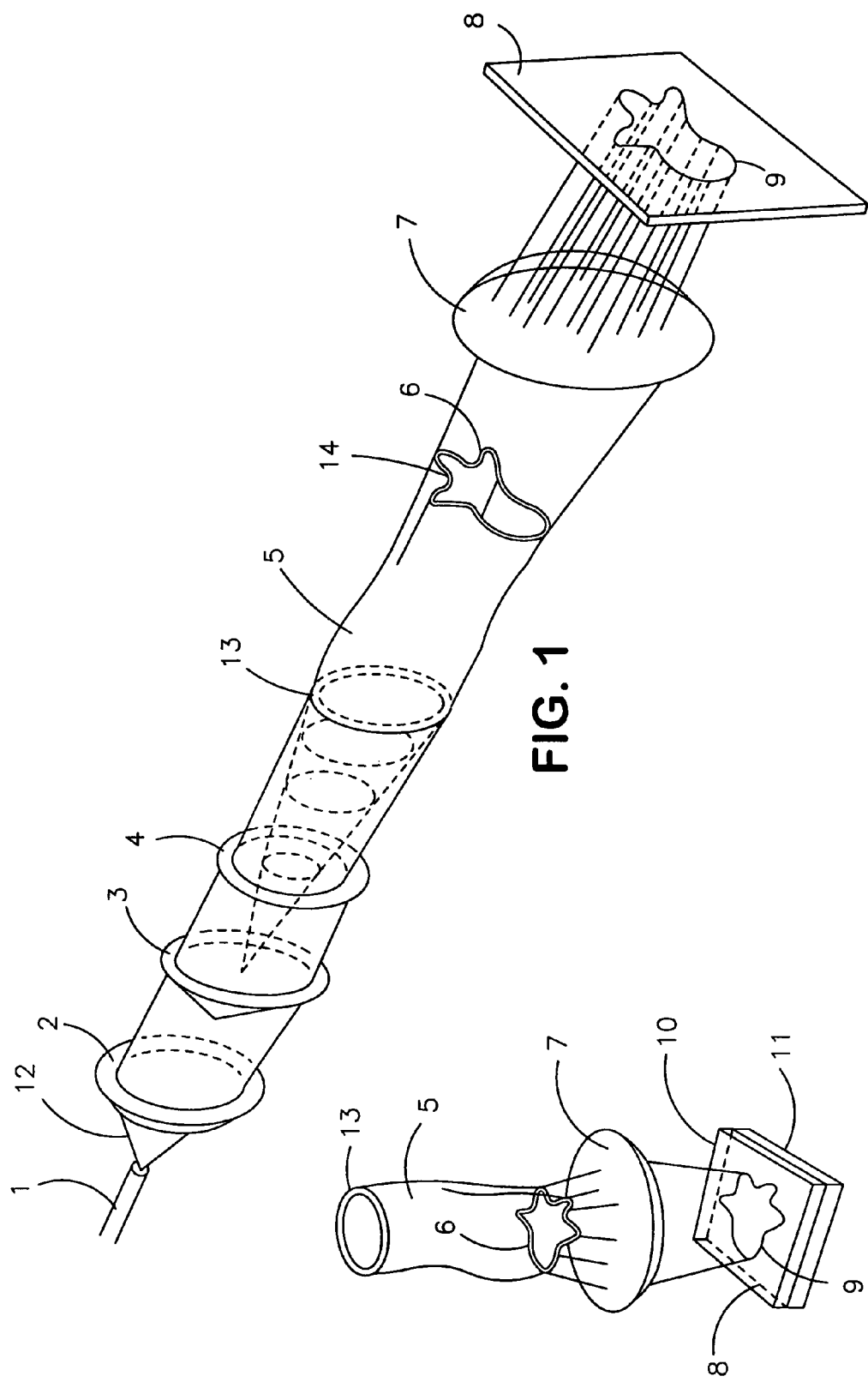

METHOD AND APPARATUS FOR SIMULTANEOUSLY HEATING MATERIALS

BACKGROUND OF THE INVENTION (1) Field of the Invention

The present invention relates to a method and an apparatus for simultaneously heating materials by means of laser radiation, with an arbitrary shape of the substantially flat heating contour.

(2) Prior Art

It is known to heat materials by means of laser beams for the purpose of material shaping, for example for welding, soldering, cutting, etc. It is also known to connect plastics to one another by means of laser beams, for example using the laser transmission method. For welding purposes, the laser transmission method by means of IR radiation makes use of the different absorption in the parts to be welded to one another. The upper part, facing the laser source, is transparent to the laser beam, whereas the lower part absorbs the laser beam, and so because of the heating of the lower part the two components fuse at the welding point and are pressed together under pressure. Relatively fine and high-precision welds, in particular of micromechanical components, can be undertaken by means of the laser beam. It is advantageous to undertake the welding over the entire welding line simultaneously so that, during an exposure operation, the entire, substantially flat welding contour is heated and the components are welded to one another. In this way, the air gap between the components can be bridged during welding, and unevennesses can be balanced out.

SUMMARY OF THE INVENTION

It is therefore the object of the present invention to propose a method and an apparatus in which materials can be heated simultaneously in an arbitrary contour shape of the heating line by means of laser beams, in particular in which plastic components can be welded.

This object is achieved according to the invention by means of a method for simultaneously heating materials having an arbitrary, substantially flat shape of a heating contour by means of a laser radiation, comprising the steps of coupling a laser beam by means of optical elements in a longitudinal direction into a wall of a tube that is transparent to IR radiation and is deformed at an exit side in accordance with the heating contour, and imaging an emerging laser beam onto a heating plane by means of a converging lens and by means of an apparatus for simultaneously heating materials having an arbitrary shape of a substantially flat heating contour by means of laser radiation, comprising an optical arrangement for shaping a laser beam and for focusing the laser beam onto a tubular optical waveguide that is transparent to IR radiation and is deformed at an exit end in accordance with the heating contour and an adjoining means for focusing the emerging laser beam onto a heating plane.

In accordance with the method, the laser beam is coupled by means of optical elements in the longitudinal direction at the end side into the wall of a tube which guides IR beams and is deformed at the exit side in accordance with the contour, and the emerging laser beam is subsequently imaged onto the heating plane by means of a converging lens. The thin-walled tube shapes the beam, the tube being regarded not only as an optical waveguide and beam transformer, but also as homogenization means for the light intensity. For this purpose, the two ends of said thin-walled tube are highly polished in order to ensure that the laser beams are coupled in and coupled out without any losses. The circle circumference of the light-guiding tube corresponds to the desired overall heating contour length, thereby realizing most closed heating contours. The tube preferably remains in its round shape on one side of the tube. This side serves as an interface for coupling in light. The other side of the tube is shaped in a component-specific manner in order to produce the desired contour. The reshaping of this side may be realized in various ways, one possibility being for example to heat a plastic tube with hot air, to slightly soften the plastic and then to shape it into the desired contour figure by means of auxiliary shaping tools. Another type of shaping is production by means of injection-molding tools. Generally, all materials which ensure the above-mentioned functions are suitable, for example plastic, glass or tools based on glass.

In order to enable light to be coupled in in a homogenized manner, the laser radiation may preferably be reshaped annularly. In this case, the circle circumference of the ring should precisely correspond to the circle circumference of the plastic tube.

The annularly shaped laser radiation is advantageously achieved by means of an axicon lens. The latter transfers the laser light into an annular shape and it is subsequently focused sharply onto the cross section of the light-guiding tube by means of a downstream converging lens. As a result, the laser energy can be coupled into the light-guiding tube without any losses.

The laser beam, which emerges for example from an optical fiber, may be collimated onto the axicon lens via a converging lens. When the laser light emerges from the other side of the light-guiding tube, it will radiate out at a greater angle of divergence. Since there is an irreducible distance between the exit of the plastic tube and the heating plane, the exit figure is advantageously precisely imaged onto the heating plane again by means of a converging lens. This results in the desired working distance between the end side of the tube and the component. The homogenization of the beam intensity is improved by the length of the tube. The latter itself may be chosen in a variable manner.

The invention results in a high flexibility in the production of such a light-guiding tube as an optical tool. The formation of annular laser beams and the variation of the ring circumference can be realized relatively simply, so that the outlay for the production of such a complete device is low and thus highly advantageous.

This technique makes it possible, inter alia, for plastic components to be welded simultaneously, the progressive technique in which an ever higher laser power can be emitted from a point being advantageous. In this case, the fiber laser offers a small focusable spot size within 6 to 50 µm. The optical power of this type of laser can be scaled arbitrarily from a few watts up to a few kilowatts. As a result, this invention can be used technically in a broad field of application.

BRIEF DESCRIPTION OF THE DRAWINGS

The invention is shown and explained in principle below on the basis of an exemplary embodiment in the case of welding plastic components in conjunction with the accompanying drawings, in which:

FIG. 1 illustrates a perspective view of the entire apparatus;

FIG. 2 illustrates an enlarged partial illustration from the end of the light-guiding tube to the components to be welded.

DETAILED DESCRIPTION OF THE PREFERRED EMBODIMENT(S)

Figure 3:
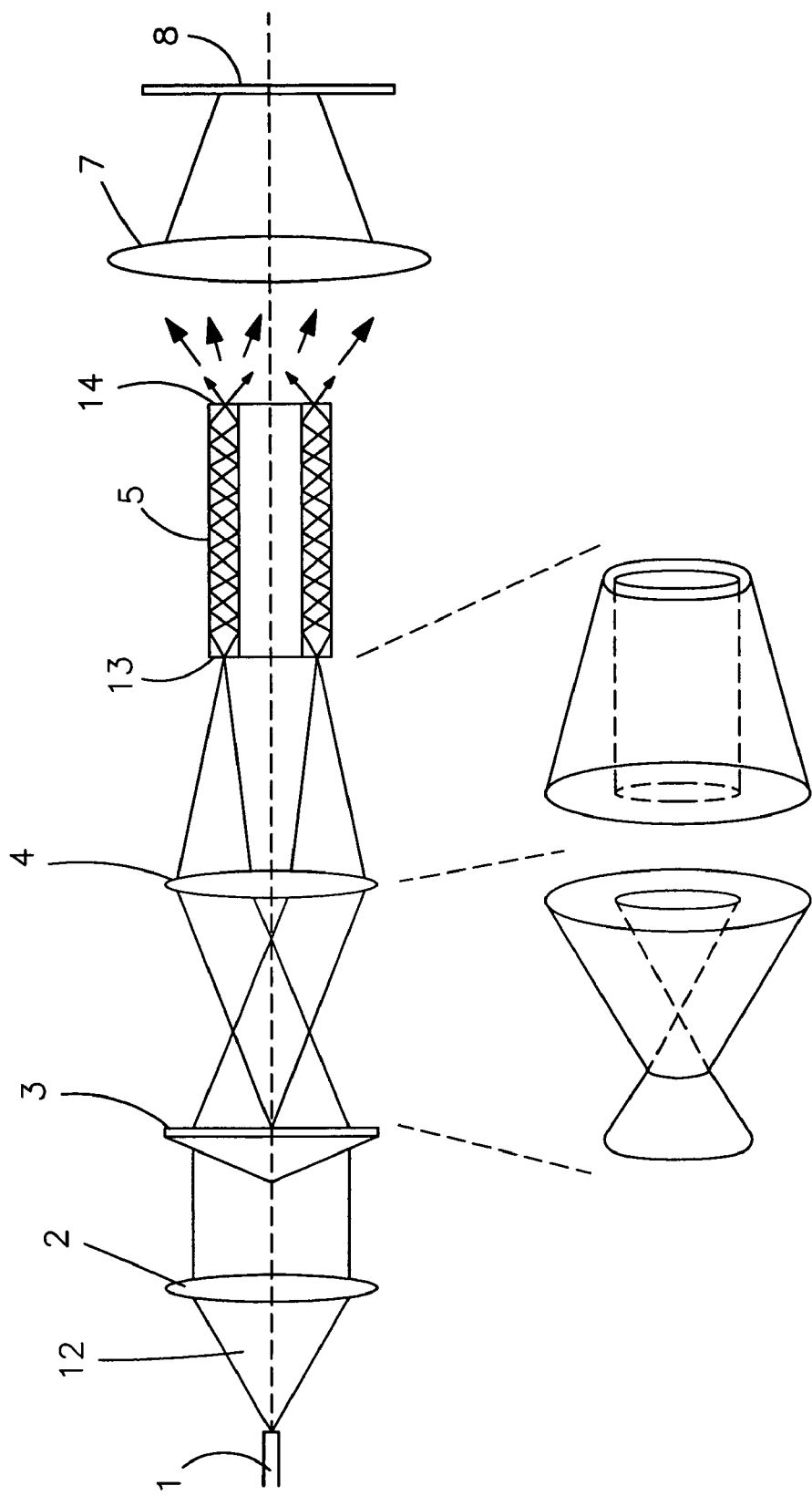
FIG. 3 illustrates an illustration of the beam path with the individual beam cones.

FIG. 1 shows an optical fiber 1, from which a laser beam 12 emerges and is collimated onto an axicon lens or else conical lens 3 via a converging lens 2. The axicon lens 3 deforms the laser beam, as illustrated in FIG. 3, to form a conical beam path. The ring impinging on the next converging lens 4 is focused onto the round end side 13 of the light-guiding tube, where it penetrates into the wall. It goes without saying that the ring formed by the lens 4 must correspond to the dimensions of the tube 5. The laser beam is then transmitted to the exit end via the tube 5, which is also formed as a plastic tube in the exemplary embodiment. At this end, the tube 5 is deformed in accordance with the contours 6, so that the laser beam that emerges there has this corresponding contour. In order to focus the laser beam onto the welding plane 8, said laser beam, after emerging from the deformed end side 14, impinges on a focusing and precisely imaging lens 7, so that the contour 9 illustrated in FIG. 1 and FIG. 2 is produced in the welding plane 8.

FIG. 2 shows the tube 5 in a smaller illustration with the round end side 13 and the deformed end side 14 and also the components to be connected to one another with the transparent joining partner 10 and the absorbent joining partner 11.

What is claimed is:

1. A method for simultaneously heating materials having an arbitrary, substantially flat shape of a heating contour by means of laser radiation, comprising the steps of:
    coupling a laser beam to an optical arrangement for annularly reshaping the laser beam and focusing said annular laser beam towards an entrance side of a tube having a wall that is transparent to IR radiation;
    coupling the laser beam in a longitudinal direction into the wall of the tube at the entrance side having one closed annularly formed entering surface;
    guiding the IR radiation through the wall of the tube from the entrance side to an exit side having one closed with respect to the entrance side differently shaped emerging surface being arbitrarily formed in accordance with a desired heating contour;
    reshaping the laser beam during passing from the tube from the entrance side towards the exit side from its annular shape to the shape of the heating contour; and
    imaging an emerging laser beam onto a heating plane by means of a converging lens to heat materials to be welded.

2. The method as claimed in claim 1, wherein annularly reshaping the laser beam by means of an axicon lens and subsequently sharply focusing the laser beam onto the annularly shaped entering surface at the entrance side of the tube by means of said converging lens.

3. The method as claimed in claim 1, further comprising using a plastic tube as the tube being adapted at its entrance side corresponding to the annularly reshaped laser beam and at its exit side to the heating contour.

4. The method as claimed in claim 3, further comprising focusing the emerging laser beam reshaped by the tube in accordance with the heating contour sharply onto a focal plane by means of the converging lens.

5. The method as claimed in claim 1, further comprising generating the laser beam by a fiber laser.

6. An apparatus for simultaneously heating materials having an arbitrary shape of a substantially flat heating contour by means of laser radiation, comprising:
    an optical arrangement having an axicon lens for annularly reshaping a laser beam and at least one convergent lens for focusing said annular laser beam towards an entrance side of an optical waveguide being transparent to IR radiation;
    a rigid linear tubular waveguide having one closed annularly formed entering surface at its entrance side for coupling the annularly shaped laser beam into a wall of the hollow waveguide and one closed differently shaped emerging surface at its exit side being arbitrarily formed in accordance with the desired heating contour; and
    an optical adjoining means for subsequently sharply focusing the emerging laser beam being reshaped in accordance with the emerging surface onto the materials to be welded in accordance with the heating contour.

7. The apparatus as claimed in claim 6, wherein the tubular optical waveguide is an optical waveguide having polished ends.

* * * * *